(12) United States Patent
Gort

(10) Patent No.: US 12,519,474 B2
(45) Date of Patent: Jan. 6, 2026

(54) ADDING LUT FRACTURABILIY TO FPGA 4-LUTS USING EXISTING ADDER CIRCUITRY

(71) Applicant: EFINIX, INC., Santa Clara, CA (US)

(72) Inventor: Marcel Gort, Toronto (CA)

(73) Assignee: EFINIX, INC., Santa Clara, CA (US)

( * ) Notice: Subject to any disclaimer, the term of this patent is extended or adjusted under 35 U.S.C. 154(b) by 1018 days.

(21) Appl. No.: 17/584,904

(22) Filed: Jan. 26, 2022

(65) Prior Publication Data

US 2022/0247413 A1 Aug. 4, 2022

Related U.S. Application Data

(60) Provisional application No. 63/144,879, filed on Feb. 2, 2021.

(51) Int. Cl.
*H03K 19/17728* (2020.01)
*G06F 7/503* (2006.01)
*H03K 19/173* (2006.01)

(52) U.S. Cl.
CPC ....... *H03K 19/17728* (2013.01); *G06F 7/503* (2013.01); *H03K 19/1737* (2013.01)

(58) Field of Classification Search
CPC ......... H03K 19/1737; H03K 19/17728; H03K 19/17736; H03K 17/62; H03K 17/735; H03K 17/76; G06F 7/501–503; G06F 15/7867
See application file for complete search history.

(56) References Cited

U.S. PATENT DOCUMENTS

| | | | |
|---|---|---|---|
| 6,747,480 B1 * | 6/2004 | Kaptanoglu | H03K 19/17748 |
| | | | 326/47 |
| 6,798,240 B1 * | 9/2004 | Pedersen | H03K 19/17728 |
| | | | 326/39 |

(Continued)

FOREIGN PATENT DOCUMENTS

| CN | 1937409 A | 3/2007 |
|---|---|---|
| CN | 101505148 A | 8/2009 |

(Continued)

OTHER PUBLICATIONS

Office Action received for Chinese Patent Application No. 202210114461.6, mailed on Sep. 9, 2024, 13 pages of original documents only.

(Continued)

*Primary Examiner* — Jason M Crawford
(74) *Attorney, Agent, or Firm* — Womble Bond Dickinson (US) LLP

(57) ABSTRACT

A field programmable gate array (FPGA) has a 4-LUT (lookup table) that has four stages of multiplexers. The 4-LUT is fracturable. The 4-LUT being fracturable includes the capability to implement multiple LUTs in an instance of FPGA programming for functions from a group that includes adder functions and further functions. The 4-LUT has outputs exposed to programmable connection in accordance with FPGA programming. Outputs of the 4-LUT include an output of a first multiplexer in the third stage, an output of a multiplexer in the second stage, and an output of a multiplexer in the second or third stage of the 4-LUT.

20 Claims, 4 Drawing Sheets

(56) References Cited

U.S. PATENT DOCUMENTS

| | | | | |
|---|---|---|---|---|
| 7,185,035 B1* | 2/2007 | Lewis | ............... | G06F 7/501 |
| | | | | 708/235 |
| 7,205,790 B1* | 4/2007 | Young | ............... | H03K 19/1736 |
| | | | | 326/38 |
| 7,268,587 B1* | 9/2007 | Pham | ............... | H03K 19/17728 |
| | | | | 326/38 |
| 7,330,052 B2* | 2/2008 | Kaptanoglu | ....... | H03K 19/1737 |
| | | | | 326/40 |
| 7,420,390 B1* | 9/2008 | Hutton | ............... | H03K 19/1776 |
| | | | | 326/38 |
| 7,558,812 B1* | 7/2009 | Padalia | ............ | H03K 19/17728 |
| | | | | 708/235 |
| 7,565,388 B1* | 7/2009 | Baeckler | ................ | G06F 7/509 |
| | | | | 708/235 |
| 7,772,879 B1* | 8/2010 | Feng | ................ | H03K 19/17728 |
| | | | | 326/38 |
| 7,800,401 B1* | 9/2010 | Lewis | ................ | H03K 19/177 |
| | | | | 326/38 |
| 7,804,719 B1* | 9/2010 | Chirania | ......... | H03K 19/17728 |
| | | | | 365/189.05 |
| 7,812,633 B1* | 10/2010 | Lee | ................ | H03K 19/17728 |
| | | | | 326/38 |
| 7,902,864 B1* | 3/2011 | Hutton | ............ | H03K 19/17728 |
| | | | | 326/38 |
| 8,072,238 B1* | 12/2011 | Hutton | ............ | H03K 19/17728 |
| | | | | 326/38 |
| 8,237,465 B1* | 8/2012 | Schleicher | ................ | G06F 7/50 |
| | | | | 326/47 |
| 9,571,103 B2* | 2/2017 | Takemura | ............... | G11C 11/40 |
| 10,715,144 B2* | 7/2020 | Gribok | ................ | G06F 7/5306 |
| 12,249,987 B2* | 3/2025 | Singh | ............... | H03K 19/17728 |
| 2004/0155676 A1* | 8/2004 | Kaptanoglu | ..... | H03K 19/17748 |
| | | | | 326/38 |
| 2006/0017460 A1* | 1/2006 | Lewis | ................ | H03K 19/1737 |
| | | | | 326/40 |
| 2006/0139054 A1* | 6/2006 | Madurawe | ....... | H03K 19/17728 |
| | | | | 326/40 |
| 2007/0063732 A1* | 3/2007 | Kaptanoglu | ....... | H03K 19/1737 |
| | | | | 326/40 |
| 2007/0146178 A1* | 6/2007 | Lewis | ................ | H03K 19/1776 |
| | | | | 341/106 |
| 2011/0238718 A1* | 9/2011 | Langhammer | ........ | G06F 7/5057 |
| | | | | 708/235 |
| 2018/0269880 A1 | 9/2018 | Rouge et al. | | |
| 2019/0288688 A1* | 9/2019 | Gribok | ..................... | G06F 7/50 |
| 2020/0150925 A1* | 5/2020 | Greene | ............. | H03K 19/00315 |
| 2022/0247413 A1* | 8/2022 | Gort | ................ | H03K 19/17728 |
| 2022/0376693 A1* | 11/2022 | Greene | ........... | H03K 19/17728 |
| 2024/0348252 A1* | 10/2024 | Chromczak | ...... | H03K 19/17744 |

FOREIGN PATENT DOCUMENTS

| | | |
|---|---|---|
| CN | 101820278 A | 9/2010 |
| CN | 107925410 A | 4/2018 |
| WO | 2020/095347 A1 | 5/2020 |

OTHER PUBLICATIONS

Notification of the Second Office Action including Search Report, received for Chinese Patent Application No. 202210114461.6, mailed on Apr. 11, 2025, 42 pages (25 pages of English Translation and 17 pages of Original Document).

Notification to Grant Patent Right for Invention received for Chinese Patent Application No. 202210114461.6, mailed on Aug. 26, 2025, 4 pages (2 pages of English Translation and 2 page of Original Document).

* cited by examiner

ADDING LUT FRACTURABILIY TO FPGA 4-LUTS USING EXISTING ADDER CIRCUITRY

CROSS-REFERENCE TO RELATED APPLICATIONS

This application claims benefit of priority from U.S. Provisional Application No. 63/144,879 titled ADDING LUT FRACTURABILITY TO FPGA 4-LUTS USING EXISTING ADDER CIRCUITRY and filed Feb. 2, 2021, which is hereby incorporated by reference.

TECHNICAL FIELD

The technical field of the present disclosure relates broadly to field programmable gate arrays (FPGAs) and more specifically to FPGAs with fracturable components.

BACKGROUND

Modern FPGAs based on 6-LUTs often include "fracturability", which allows the LUT to be used as two or more LUTs with fewer inputs. For example, a 5-LUT can be used as two 4-LUTs, as long as all inputs are identical. One caveat is that an extra output must be routed out from the 5th stage of the 6-LUT, which adds extra loading and slows down the LUT. This fracturability is common for 6-LUT architectures because circuits do not often synthesize to many 6-input functions. It is common that synthesis creates many functions which would be implemented with smaller LUTs. For that reason, area efficiency is greatly improved by adding fracturability to a 6-LUT architecture.

Typically, 4-LUT FPGA architectures do not have fracturability. The cost of under-using a 4-LUT with a 2-input or 3-input function is not as steep as underusing a 6-LUT. It may not be worth slowing down the 3rd stage of the 4-LUT to implement 3-3 fracturability.

Another common way a 4-LUT is fractured is to implement an adder. Adders are sometimes implemented on FPGAs by using the 4-LUT to implement propagate, generate, and sum functions. In essence, this is fracturing the 4-LUT into two 2-input and one 3-input function. Propagate is a function of A and B, generate is also a function of A and B, and Sum is a function of A, B, and C in.

BRIEF SUMMARY

Embodiments described herein include field programmable gate arrays (FPGAs), lookup tables (LUTs), fracturable components, fracturable LUTs, a fracturable 4-LUT, adder circuits, computer aided design (CAD) tools and systems, various apparatuses and related methods.

One embodiment is a field programmable gate array that includes a 4-LUT. The 4-LUT has first, second, third and fourth stages of multiplexers. The 4-LUT is fracturable to implement multiple LUTs in an instance of FPGA programming for functions from a group that includes adder functions and further functions. The 4-LUT has outputs exposed to programmable connection and general routing in accordance with FPGA programming. These outputs include an output of a first multiplexer in the third stage, an output of a first multiplexer in the second stage, and an output of a multiplexer in the second or third stage.

One embodiment is a method of operation of a field programmable gate array. The method includes fracturing a 4-LUT that has first, second, third and fourth stages of multiplexers, to implement multiple LUTs that each have fewer than four stages of multiplexers. Fracturing and implementing multiple LUTs is for functions from a group that includes adder functions and further functions. The method includes programming connection of at least two of the multiple outputs of the 4-LUT to further implement the multiple LUTs from the 4-LUT in an instance of FPGA programming. The multiple outputs of the 4-LUT for programming connection include an output of a first multiplexer in the third stage of the 4-LUT, an output of a first multiplexer in a second stage of the 4-LUT, and an output of a multiplexer in the second or third stage of the 4-LUT.

One embodiment is a tangible, non-transitory, computer-readable media having instructions in the media. The instructions, when executed by a processor, cause the processor to perform a method. The method includes fracturing a 4-LUT that has first, second, third and fourth stages of multiplexers, to implement multiple LUTs each of which has fewer than four stages of multiplexers. The fracturing and implementing of multiple LUTs is for functions from a group that includes adder functions and further functions. The 4-LUT is fracturable and in a field programmable gate array (FPGA). The method includes programming connection of at least two of multiple outputs of the 4-LUT to further implement the multiple LUTs from the 4-LUT in an instance of FPGA programming. The multiple outputs of the 4-LUT include an output of a first multiplexer in a third stage of the 4-LUT, an output of a first multiplexer in a second stage of the 4-LUT, and an output of a multiplexer in the second or third stage of the 4-LUT.

BRIEF DESCRIPTION OF DRAWINGS

Embodiments described herein will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Regarding terminology, the terms "multiplexer", "multiplexor" and "mux" may be used herein interchangeably to describe a circuit that selects from among multiplexer inputs to drive a multiplexer output. A LUT (lookup table) as a component in an FPGA may be described in terms of stages (i.e., levels or layers) of multiplexers and multiplexing in the LUT, for example a 4-LUT is a lookup table that has four stages of multiplexers. Fracturability of a LUT may be described in terms of one or more LUTs that can be implemented using the fracturable LUT, using commas, slashes or hyphens as delimiters in a naming convention. Each stage of multiplexers is operated by a selector or selection input, and the fracturability of the LUT may be described in terms of stages, functions of the selection inputs, or other aspects of multiple LUTs that can be implemented through fracturability of the LUT. For example, 2/3 fracturability, meaning capability of implementing a 2-LUT and a 3-LUT, could also be termed 3/2 fracturability, 2-3 fracturability, 3-2 fracturability, 3, 2 fracturability, or 2, 3 fracturability.

One embodiment described herein is a method of re-using adder circuitry in a 4-LUT to implement fracturability so that one or two 2-input functions and one 3-input function can be implemented with no additional LUT circuitry. Various implementations of various LUTs using fracturability of a 4-LUT are described herein. Embodiments described herein include a novel re-use of the adder-specific 4-LUT fracturability to implement any two 2-input and 3-input functions with 2 shared inputs. The delay penalty of the extra load on the second and third stages of the LUT is already paid to implement the adder, so there is no extra cost to also using this loading to implement 2/3 fracturability, in some embodiments. Different functions, such as adder functions for implementing an adder with LUTs from a fracturable LUT, and further functions for implementing further LUTs from the same fracturable LUT, are achieved through different programming of programmable connections, in various embodiments. In other words, a fracturable LUT has circuitry and programmable connections that support implementation of multiple LUTs and multiple functions in an instance of FPGA programming. Different functions can be implemented in a different instance of FPGA programming, with different programming of the programmable connections.

Figure 1:
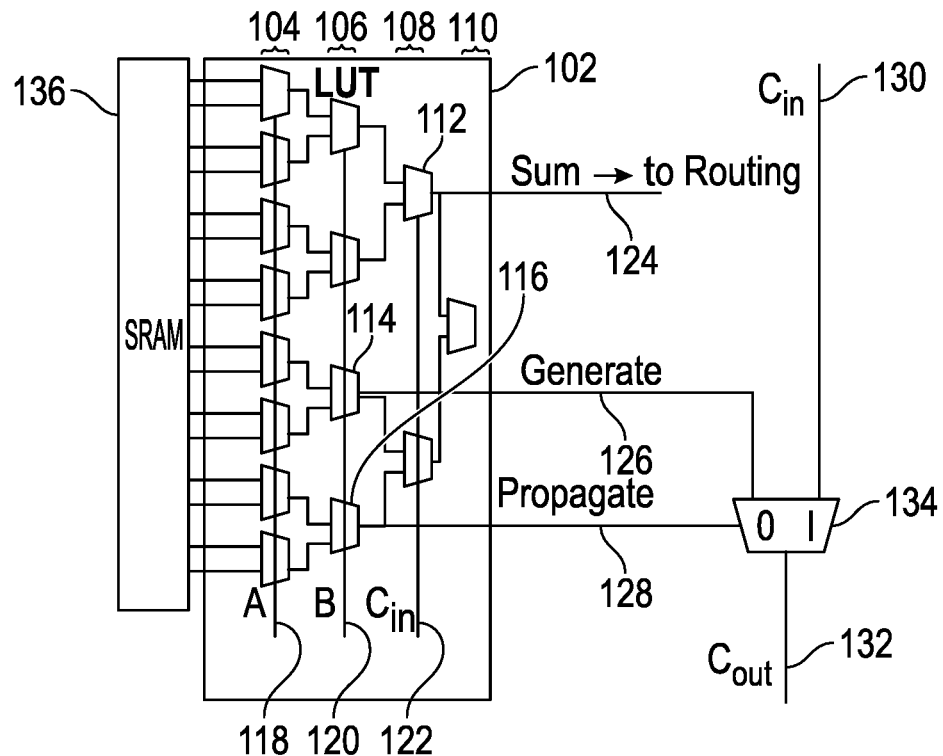
FIG. 1 shows a typical use of a 4-LUT to implement a full adder.

FIG. 1 illustrates a 4-LUT 102 that is split into one 3-input and two 2-input functions to implement the three functions in a full adder (propagate or carry propagate, generate or carry generate, and sum). Referring to FIG. 1, since propagate (a two input function of A and B), generate (a different two input function of A and B), and sum (a three input function of A, B and C in or carry in) all share 2 inputs (A and B), the only modification that is necessary to the 4-LUT 102 to implement a full adder is to tap the second stage of the bottom half of the LUT and the third stage of the top half of the LUT. The propagate and generate signals are then used along with the C in or carry in as inputs to a hardened mux 134 to complete the Cout or carry out of the full adder function.

The embodiment of a 4-LUT 102 that has fracturability to implement a full adder, as depicted in FIG. 1, has four stages 104, 106, 108, 110 of multiplexers. Each stage of multiplexers has a select input 118, 120, 122 (the select input of the single multiplexer in the fourth stage 110 is not shown in the drawing and is, e.g., tied to a known state or implemented as a don't care but not otherwise used in implementing a full adder). When programmed in accordance with FPGA programming to implement a full adder, the 4-LUT 102 is fractured to operate as a 3-LUT that produces sum as the output 124 of a multiplexer 112 in the third stage 108, a 2-LUT that produces generate, or carry generate, as the output 126 of a multiplexer 114 in the second stage 106, and another 2-LUT that produces propagate, or carry propagate, as the output 128 of another multiplexer 116 in the second stage 106. To further implement the full adder, the FPGA programming programs outputs of the 4-LUT 102 to connect sum, as the output 124 of the multiplexer 112 in the third stage 108, to general routing. FPGA programming programs outputs of the 4-LUT 102 to connect generate or carry generate as an intermediate signal of the adder and an output 126 of the multiplexer 114 in the second stage 106, to the multiplexer 134, which is external to the LUT 102 but internal to the FPGA. FPGA programming programs outputs of the 4-LUT 102 to connect propagate or carry propagate as another intermediate signal of the adder and an output 128 of the multiplexer 116 in the second stage 106, to the multiplexer 134. FPGA programming programs C in or carry in as an input 130 to the external multiplexer 134, and programs Cout or carry out as an output 132 of the external multiplexer 134.

Figure 2:
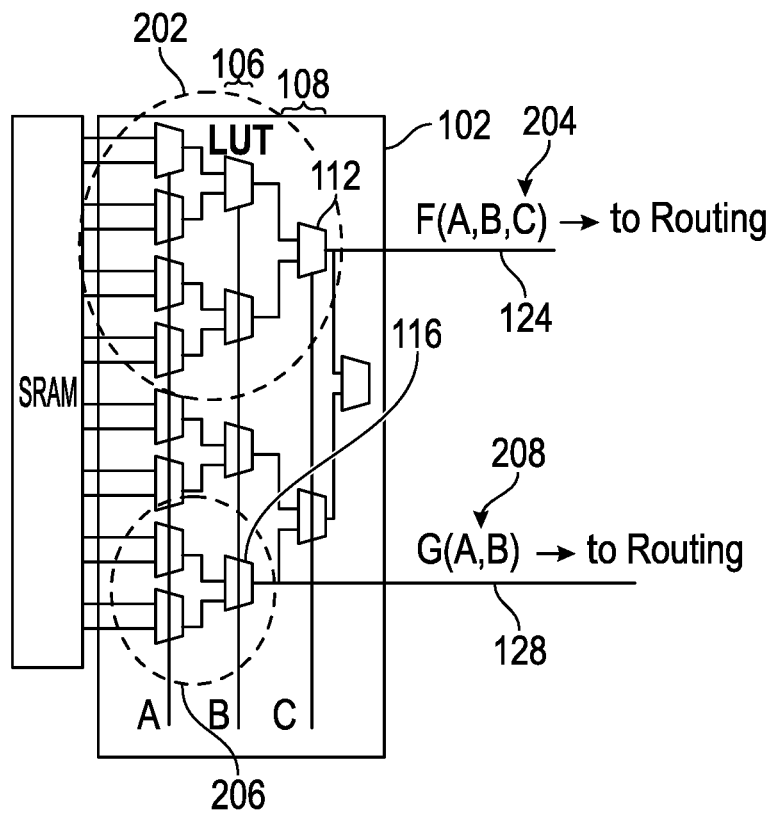
FIG. 2 shows re-using the 4-LUT adder fracturability to implement an arbitrary 2-input and an arbitrary 3-input function that share 2 inputs.

FIG. 2 illustrates the same LUT stages of FIG. 1 that are used to implement two arbitrary functions, in accordance with one embodiment. Instead of implementing the sum, which is a function of A, B, and C in, the fracturable LUT implements an arbitrary function 204 of A, B, and C, depicted as F(A, B, C). Only one of the two 2-LUT stages on the bottom are used to implement another function 208 G(A, B).

The embodiment of a 4-LUT 102 that has fracturability to implement the full adder, as depicted in FIG. 1, herein has and uses 2/3 fracturability to implement a 2-LUT that has the output 128 of the multiplexer 116 in the second stage 106, for a two input function 208, for example G(A, B), and implement a 3-LUT that has the output 124 of the multiplexer 112 in the third stage 108, for a three input function 204, for example F(A, B, C). The two functions 204, 208 share inputs A and B, but are otherwise independent since they use different, nonoverlapping groups 202, 206 of multiplexers of the 4-LUT 102. It should be appreciated that the generalized 2/3 fracturability includes capability of implementing the functions for an adder (see FIG. 1) and capability of implementing further functions (see FIG. 2).

Figure 3:
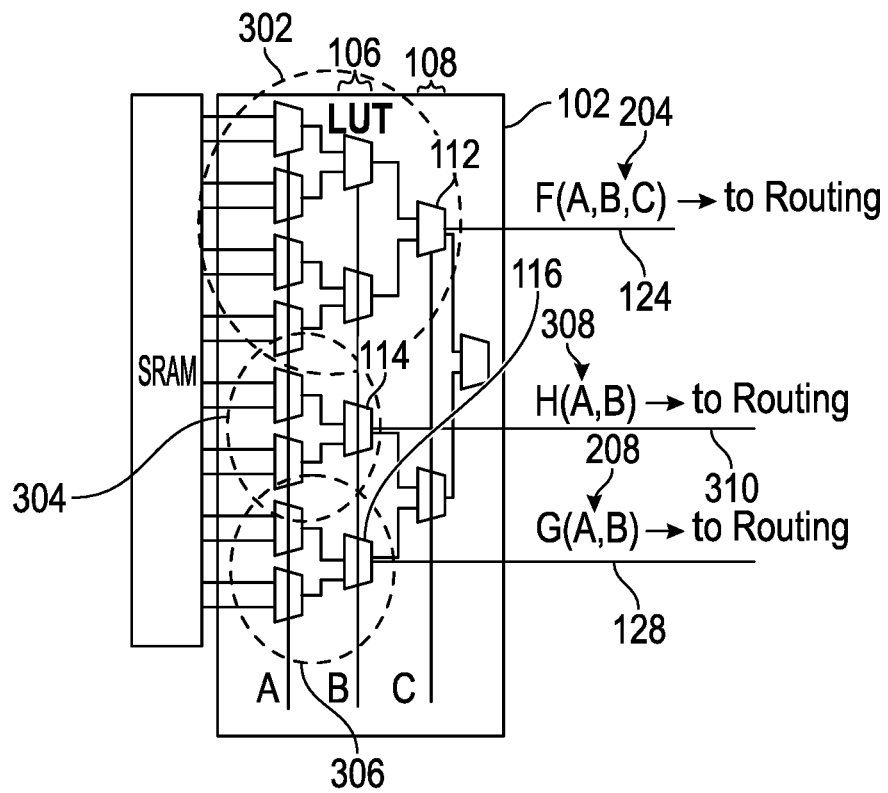
FIG. 3 shows re-using the 4-LUT adder fracturability to implement two arbitrary 2-input and one arbitrary 3-input function, all with 2 shared inputs.

FIG. 3 illustrates the full fracturability of the adder used to implement one 3-input and two 2-input functions, as long as they share two inputs, in accordance with one embodiment. Note that in one embodiment all 3 outputs are routed out of the LUT in this case.

The embodiment of a 4-LUT 102 that has fracturability to implement the full adder, as depicted in FIG. 1, herein has and uses 2/2/3 fracturability to implement a 2-LUT that has the output 128 of the multiplexer 116 in the second stage 106, for a two input function 208, for example G(A, B), implement another 2-LUT that has the output 310 of another multiplexer 114 in the second stage 106, for a two input function 308, for example H(A, B), and implement a 3-LUT that has the output 124 of the multiplexer 112 in the third stage 108, for a three input function 204, for example F(A, B, C). The three functions 204, 208, 308 share inputs A and B, but are otherwise independent since they use different, nonoverlapping groups 302, 304, 306 of multiplexers of the 4-LUT 102. It should be appreciated that the generalized 2/2/3 fracturability includes capability of implementing the functions for an adder (see FIG. 1) and capability of implementing further functions (see FIG. 3).

Figure 4:
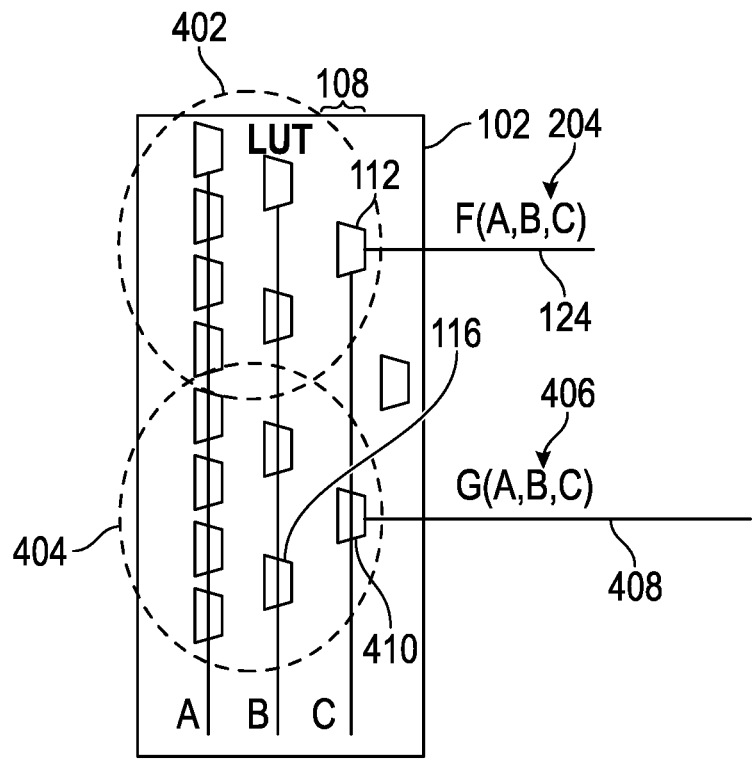
FIG. 4 shows using the bottom of the third stage of the LUT to implement 3/3 fracturability.

FIG. 4 illustrates a bottom half of the third stage of the LUT being routed out to implement two 3-input functions.

This re-uses some of fracturability that is necessary to implement the adder but also requires adding some loading.

The embodiment of a 4-LUT 102 that has fracturability to implement the full adder, as depicted in FIG. 1, herein has and uses 3/3 fracturability to implement a 3-LUT that has the output 408 of a multiplexer 410 in the third stage 108, for a three input function 406, for example G(A, B, C), and implement a 3-LUT that has the output 124 of another multiplexer 112 in the third stage 108, for a three input function 204, for example F(A, B, C). The two functions 204, 406 share inputs A, B and C but are otherwise independent since they use different, nonoverlapping groups 402, 404 of multiplexers of the 4-LUT 102.

Figure 5:
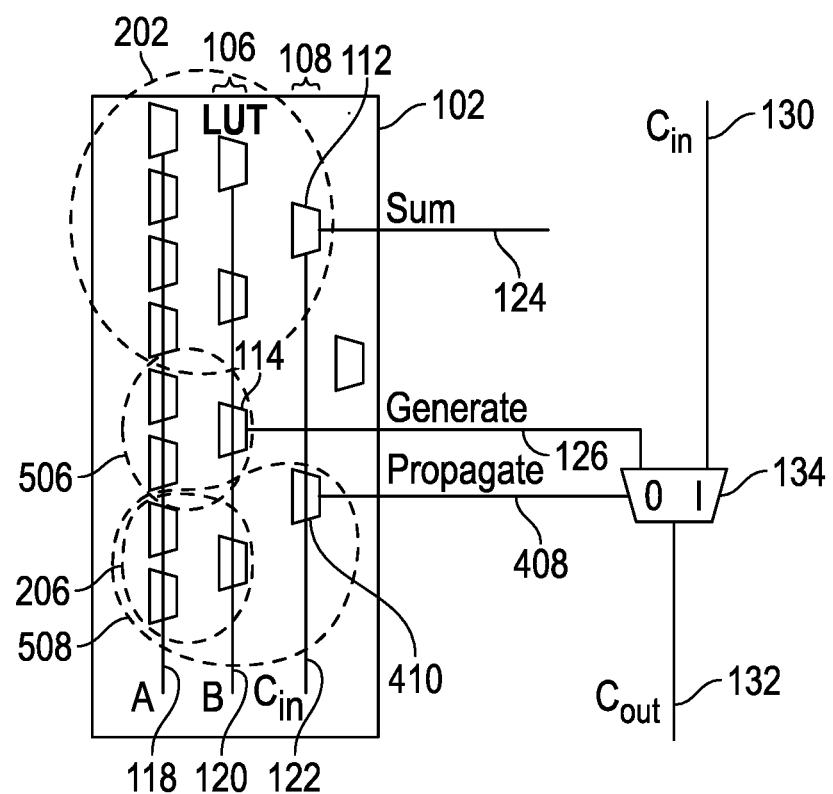
FIG. 5 shows a further embodiment of using a 4-LUT to implement a full adder.

FIG. 5 shows a further embodiment of using a 4-LUT to implement a full adder. In this embodiment, propagate, or carry propagate, is generated in the third stage 108 of the 4-LUT 102, rather than in the second stage 106 as shown in FIG. 1. This embodiment directly supports 3/3 fracturability of the 4-LUT as shown in FIG. 4, by making the outputs 124, 408 of both multiplexers 112, 410 in the third stage 108 available for programmable connection to general routing in the FPGA.

Continuing with FIG. 5, a 4-LUT 102 is split into one 3-input and two 2-input functions to implement the three functions in a full adder (propagate or carry propagate, generate or carry generate, and sum). When programmed in accordance with FPGA programming to implement a full adder, the 4-LUT 102 is fractured to operate as a 3-LUT that produces sum as the output 124 of a multiplexer 112 in the third stage 108, a 2-LUT that produces generate, or carry generate, as the output 126 of a multiplexer 114 in the second stage 106, and another 2-LUT that produces propagate, or carry propagate, as the output 408 of another multiplexer 410 in the third stage 108. Ordinarily, carry propagate is a two input function, i.e., a function of inputs A and B, and was implemented with the output 128 of a multiplexer 116 in the second stage 106 of the LUT 102 in FIG. 1. Here, in FIG. 5, carry propagate is implemented with the output of a multiplexer 410 in the third stage 108 of multiplexers, using the same group 206 of multiplexers within a larger group 508, and carry in or C in as a don't care for the function. To further implement the full adder, the FPGA programming programs outputs of the 4-LUT 102 to connect sum, as the output 124 of the multiplexer 112 in the third stage 108, to general routing, connect generate or carry generate as an intermediate signal of the adder and an output 126 of the multiplexer 114 in the second stage 106, to the multiplexer 134, which is external to the LUT 102 but internal to the FPGA, and connect propagate or carry propagate as another intermediate signal of the adder and an output 408 of the multiplexer 410 in the third stage 108, to the multiplexer 134. FPGA programming programs C in or carry in as an input 132 the external multiplexer 134, and programs Cout or carry out as an output 132 of the external multiplexer 134. Although the functions for sum, generate or carry generate, and propagate or carry propagate share inputs A and B, they are otherwise independent since generated by different groups 202, 506, 508 of multiplexers of the fracturable 4-LUT 102. This in turn supports further fracturability (see FIG. 5).

Figure 6:
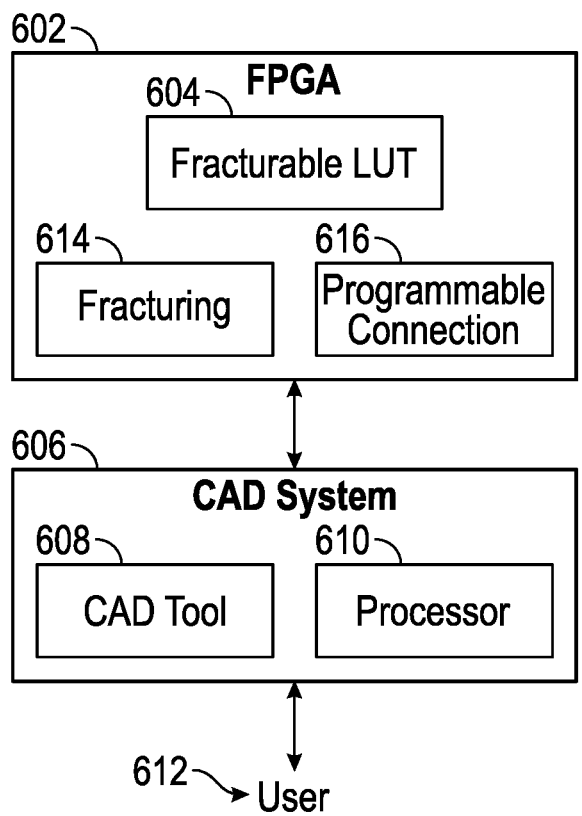
FIG. 6 shows a CAD system programming an FPGA that has a fracturable LUT.

FIG. 6 shows a CAD system 606 programming an FPGA that has a fracturable LUT 604. A user 612 interacts with the CAD system 606, which has a processor 610 executing a CAD tool 608, e.g., implemented in computer programming. The CAD tool 608 and CAD system 606 act to program the FPGA 602, which includes the actions of fracturing 614 the fracturable LUT 604, and programming the programmable connections 616 of the fracturable LUT 604 and remainder of FPGA circuitry. In various embodiments, the FPGA could have one or many LUTs that are fracturable, and further circuitry and general routing that is programmable, and embodiments of LUTs described herein and variations are suitable for embodiments of programming an FPGA.

Figure 7:
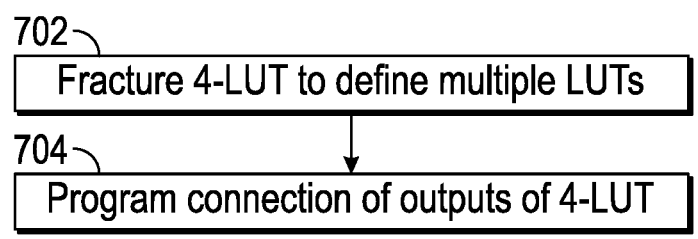
FIG. 7 is a flow diagram of a method of operation of an FPGA that has a fracturable LUT.

FIG. 7 is a flow diagram of a method of operation of an FPGA 602 that has a fracturable LUT 604. The method could be performed using the CAD tool 608 and CAD system 606 described above with reference to FIG. 6, using fracturable LUTs as described above with reference to FIGS. 1-5, or variations thereof. The method could be performed by a processor, acting on an FPGA. The method could be embodied in instructions for a processor, in tangible, non-transient, computer-readable media.

In an action 702, a 4-LUT is fractured, to define multiple LUTs. This is part of defining overall functionality of a programmed FPGA, in various embodiments. Fracturing defines which LUT or LUTs from among the possible LUTs of a fracturable LUT, are used in a specific implementation and specific instance of FPGA programming. It is possible to define a single LUT, or multiple LUTs, from a fracturable LUT, in an instance of FPGA programming.

In an action 704, connection of outputs of the 4-LUT are programmed. For example, the outputs of the fracturable 4-LUT are exposed for programmable connection to general routing, and thereby to other circuits in the FPGA. Defining multiple LUTs, in the action 702, and programming the connection of the outputs of the 4-LUT, in the action 704, make use of the fracturability of the 4-LUT.

It should be appreciated that a specific set of LUTs and a specific set of programmed connections are made in a specific instance of FPGA programming for a specific fracturable LUT, and another instance of FPGA programming could produce a different set of LUTs and a different set of programmed connections. Different embodiments of LUTs could have different LUTs that can be implemented, different outputs that are exposed for programmable connection, and different fracturability. A LUT with a lower number of characteristic stages can be implemented from a LUT with a higher number of characteristic stages by having a do not care as one of the inputs of the function being implemented. For example, a 2/3 fracturable LUT (see FIG. 2), a 2/2/3 fracturable LUT (see FIG. 3), or a 3/3 fracturable LUT (see FIG. 4) also has 2/2 fracturability to implement two, two input LUTs by use of a do not care as above. This principle is applicable to the adder embodiment in FIG. 5, and vice versa.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present description also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A field programmable gate array (FPGA), comprising:
a 4-LUT (lookup table) comprising first, second, third and fourth stages of multiplexers;
the 4-LUT being fracturable to implement a plurality of LUTs in an instance of FPGA programming for functions from a group comprising adder functions and further functions; and
the 4-LUT having outputs exposed to programmable connection in accordance with the FPGA programming, including an output of a first multiplexer in the third stage, an output of a first multiplexer in the second stage, and an output of a multiplexer in the second or third stage.

2. The FPGA of claim 1, wherein:
the 4-LUT is fracturable to implement a full adder using the 4-LUT and an external multiplexer that is external to the 4-LUT and internal to the FPGA, with the 4-LUT having select inputs comprising a first operand input to the first stage of multiplexers, a second operand input to the second stage of multiplexers, and a carry in to the third stage of multiplexers;
the full adder having intermediate signal lines comprising a generate carry from the output of the first multiplexer in the second stage and a propagate carry from an output of a second multiplexer in the second stage that is the output of the multiplexer in the second or third stage; and
the full adder having outputs comprising a sum from the output of the first multiplexer in the third stage and a carry output from an output of the external multiplexer, with the external multiplexer having inputs comprising the carry in and the generate carry and having a select input comprising the propagate carry.

3. The FPGA of claim 1, wherein:
the 4-LUT is fracturable to implement a full adder using the 4-LUT and an external multiplexer that is external to the 4-LUT and internal to the FPGA, with the 4-LUT having select inputs comprising a first operand input to the first stage of multiplexers, a second operand input to the second stage of multiplexers, and a carry in to the third stage of multiplexers;
the full adder having intermediate signal lines comprising a generate carry from the output of the first multiplexer in the second stage and a propagate carry from an output of a second multiplexer in the third stage that is the output of the multiplexer in the second or third stage;
the full adder having outputs comprising a sum from the output of the first multiplexer in the third stage, and a carry output from an output of the external multiplexer, with the external multiplexer having inputs comprising the carry in and the generate carry and having a select input comprising the propagate carry.

4. The FPGA of claim 1, wherein:
the 4-LUT has 2/3 fracturability to implement a 2-LUT having the output of the first multiplexer in the second stage for a two input function, and a 3-LUT having the output of the first multiplexer in the third stage for a three input function.

5. The FPGA of claim 1, wherein:
the 4-LUT has 2/3 fracturability to implement a 2-LUT having an output of a second multiplexer in the second stage that is the output of the multiplexer in the second or third stage for a two input function, and a 3-LUT having the output of the first multiplexer in the third stage for a three input function.

6. The FPGA of claim 1, wherein:
the 4-LUT has fracturability comprising circuitry and programmable connections to implement a full adder that has the adder functions and has 2/3 fracturability comprising same circuitry and same programmable connections to implement a 2-LUT and a 3-LUT that have the further functions.

7. The FPGA of claim 1, wherein:
the 4-LUT has 3/3 fracturability to implement a 3-LUT having the output of the first multiplexer in the third stage for a three input function, and a 3-LUT having an output of a second multiplexer in the third stage that is the output of the multiplexer in the second or third stage for a further three input function.

8. The FPGA of claim 1, wherein:
the 4-LUT has 2/2/3 fracturability to implement a 2-LUT having the output of the first multiplexer in the second stage for a two input function, a further 2-LUT having an output of a second multiplexer in the second stage that is the output of the multiplexer in the second or third stage for a further two input function, and a 3-LUT having the output of the first multiplexer in the third stage for a three input function.

9. The FPGA of claim 1, wherein:
the 4-LUT has 2/2 fracturability to implement a 2-LUT having the output of the first multiplexer in the second stage for a two input function, and a further 2-LUT having the output of the first multiplexer in the third stage for a three input function having a do not care for one of the three inputs.

10. A method of operation of a field programmable gate array (FPGA), comprising:
fracturing a 4-LUT having first, second, third and fourth stages of multiplexers, to implement a plurality of LUTs each having fewer than four stages of multiplexers for functions from a group comprising adder functions and further functions; and
programming connection of at least two of a plurality of outputs of the 4-LUT to further implement the plurality of LUTs from the 4-LUT in an instance of FPGA programming, wherein the plurality of outputs of the 4-LUT comprises an output of a first multiplexer in a third stage of the 4-LUT, an output of a first multiplexer in a second stage of the 4-LUT, and an output of a multiplexer in the second or third stage of the 4-LUT.

11. The method of claim 10, wherein programming connection of at least two outputs of the 4-LUT comprises:
implementing a full adder using the 4-LUT and an external multiplexer that is external to the 4-LUT and internal to the FPGA, with the 4-LUT having select inputs including a first operand input to the first stage of multiplexers, a second operand input to the second stage of multiplexers, and a carry in to the third stage of multiplexers;
the full adder having intermediate signal lines including a generate carry from the output of the first multiplexer in the second stage and a propagate carry from an output of a second multiplexer in the second stage that is the output of the multiplexer in the second or third stage; and
the full adder having outputs including a sum from the output of the first multiplexer in the third stage and a carry output from an output of the external multiplexer, with the external multiplexer having inputs including the carry in and the generate carry and having a select input including the propagate carry.

12. The method of claim 10, wherein programming connection of at least two outputs of the 4-LUT comprises:
using 2/3 fracturability of the 4-LUT to implement a 2-LUT having the output of the first multiplexer in the second stage for a two input function, and a 3-LUT having the output of the first multiplexer in the third stage for a three input function.

13. The method of claim 10, wherein programming connection of at least two outputs of the 4-LUT comprises:
using 3/3 fracturability of the 4-LUT to implement a 3-LUT having the output of the first multiplexer in the third stage for a three input function, and a 3-LUT having an output of a second multiplexer in the third stage that is the output of the multiplexer in the second or third stage for a further three input function.

14. The method of claim 10, wherein programming connection of at least two outputs of the 4-LUT comprises:
using 2/2/3 fracturability of the 4-LUT to implement a 2-LUT having the output of the first multiplexer in the second stage for a two input function, a further 2-LUT having an output of a second multiplexer in the second stage that is the output of the multiplexer in the second or third stage for a further two input function, and a 3-LUT having the output of the first multiplexer in the third stage for a three input function.

15. The method of claim 10, wherein programming connection of at least two outputs of the 4-LUT comprises:
using 2/2 fracturability of the 4-LUT to implement a 2-LUT having the output of the first multiplexer in the second stage for a two input function, and a further 2-LUT having the output of the first multiplexer in the third stage for a three input function having a do not care for one of the three inputs.

16. A tangible, non-transitory, computer-readable media having instructions thereupon which, when executed by a processor, cause the processor to perform a method comprising:
fracturing a 4-LUT having first, second, third and fourth stages of multiplexers, to implement a plurality of LUTs each having fewer than four stages of multiplexers, for functions from a group comprising adder functions and further functions, the 4-LUT being fracturable and in a field programmable gate array (FPGA); and
programming connection of at least two of a plurality of outputs of the 4-LUT to further implement the plurality of LUTs from the 4-LUT in an instance of FPGA programming, wherein the plurality of outputs of the 4-LUT comprises an output of a first multiplexer in a third stage of the 4-LUT, an output of a first multiplexer in a second stage of the 4-LUT, and an output of a multiplexer in the second or third stage of the 4-LUT.

17. The computer-readable media of claim 16, wherein programming connection of at least two outputs of the 4-LUT comprises:
implementing a full adder using the 4-LUT and an external multiplexer that is external to the 4-LUT and internal to the FPGA, with the 4-LUT having select inputs including a first operand input to the first stage of multiplexers, a second operand input to the second stage of multiplexers, and a carry in to the third stage of multiplexers;
the full adder having intermediate signal lines including a generate carry from the output of the first multiplexer in the second stage and a propagate carry from an output of a second multiplexer in the second stage that is the output of the multiplexer in the second or third stage; and
the full adder having outputs including a sum from the output of the first multiplexer in the third stage and a carry output from an output of the external multiplexer, with the external multiplexer having inputs including the carry in and the generate carry and having a select input including the propagate carry.

18. The computer-readable media of claim 16, wherein programming connection of at least two outputs of the 4-LUT comprises:
using 2/3 fracturability of the 4-LUT to implement a 2-LUT having the output of the first multiplexer in the second stage for a two input function, and a 3-LUT having the output of the first multiplexer in the third stage for a three input function.

19. The computer-readable media of claim 16, wherein programming connection of at least two outputs of the 4-LUT to general routing comprises:
using 3/3 fracturability of the 4-LUT to implement a 3-LUT having the output of the first multiplexer in the third stage for a three input function, and a 3-LUT having an output of a second multiplexer in the third stage that is the output of the multiplexer in the second or third stage for a further three input function.

20. The computer-readable media of claim 16, wherein programming connection of at least two outputs of the 4-LUT to general routing comprises:
using 2/2/3 fracturability of the 4-LUT to implement a 2-LUT having the output of the first multiplexer in the second stage for a two input function, a further 2-LUT having an output of a second multiplexer in the second stage that is the output of the multiplexer in the second or third stage for a further two input function, and a 3-LUT having the output of the first multiplexer in the third stage for a three input function.

* * * * *